United States Patent Office 3,168,283
Patented Feb. 2, 1965

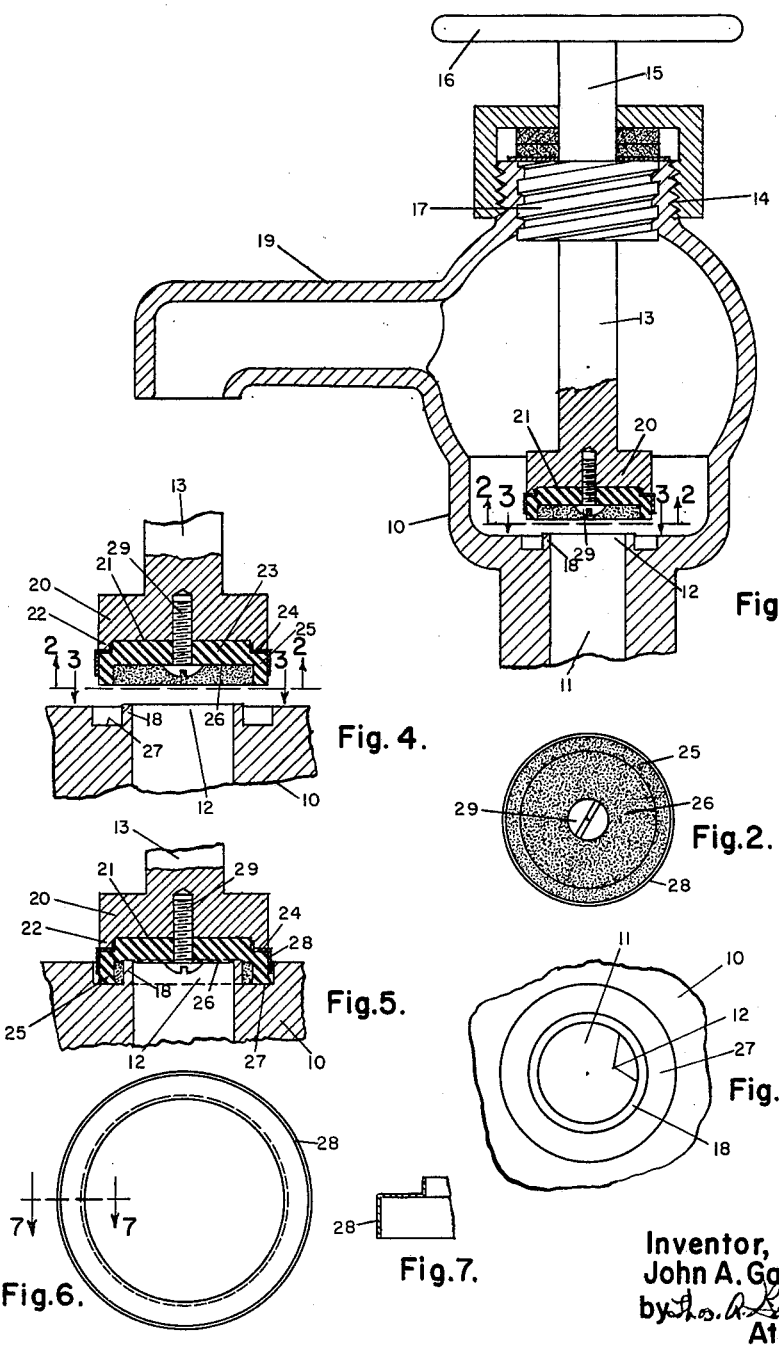

3,168,283
PARTICULAR HEAD AND SEAT COOPERATION
FOR FAUCET VALVES
John A. Gamble, % The Northern Supply Co.,
731 McAlister Ave., Waukegan, Ill.
Filed Sept. 13, 1963, Ser. No. 308,756
2 Claims. (Cl. 251—333)

This invention relates to improvements in faucet valves, and the like. Specifically, the invention concerns itself with improvements in the sealing member and related parts, by which the faucet opening is closed and sealed against leakage when the faucet handle is turned to produce the closing operation. In this connection the improvements herein disclosed have been devised with special reference to the operating conditions imposed on the sealing elements, when the faucet is used as a water faucet.

A prime object of the invention relates to the production of an improved sealing element or unit which is forced into engagement with the stationary perimeter around the supply water opening, when the closing operation is produced. Such stationary perimeter conventionally includes a slightly raised rib surrounding the water passage, and against which a sealing gasket or the like is forced by the final turning or rotational movement of the faucet handle. Such handle conventionally produces the opening and closing movements of the gasket by a screw-threaded engagement between the rotatable element and a stationary part of the faucet body. Accordingly, as the sealing gasket is brought firmly to its final sealing condition against the rib above referred to, there is necessarily produced an angular distortion of the face of the gasket which is in engagement with such rib. Thus the final sealing action imposes a severe angular distortion on the surface of the sealing gasket, with consequent wear and damage to the surface of the gasket on the circular area or annulus which is forced into firm engagement with the rib during such final sealing movement. Furthermore, as the final stage of the closing operation occurs the size of the opening becomes reduced until just before firm engagement between the gasket and the rib there is produced a fine opening between the parts, so that during such final closing stage the water is caused to flow at high velocity outwardly across the face of the gasket. Any fine solids carried by the water stream are thus forced over the annular surface of the gasket with an eroding effect which finally produces slight irregularities on the surface of the gasket at the very annular area which should come into even sealing engagement with the rib. Such slight irregularities become enlarged by repeated closing operations, so that in time the sealing annulus becomes pitted and irregular. This condition requires greatly increased closing pressure to be produced in order to bring the entire perimeter of such annulus into closing engagement with the rib. Accordingly, the damage to the gasket becomes rapidly more severe, until finally it is impossible to force the gasket against the rib with sufficient firmness to produce seal completely around the perimeter.

It is also noted that the closing pressure exerted by the gasket against the rib produces lateral or radially outward distortion of the material of the gasket, so that the firmness of engagement of the gasket surface and the uniformity of such engagement around the perimeter of the rib are seriously impaired. Thus the ability to produce firm, even engagement between the gasket and the rib is progressively impaired, until it finally becomes necessary to replace the gasket. It is an object of the present invention to produce a form of gasket which will greatly reduce the erosion conditions above explained, so that the development of pitting and other irregularities on the annular surface of the gasket will be largely reduced or even avoided, with consequent longer life of the gasket, and ability to produce perfect sealing during such longer life without need of forcing the gasket against the rib with a large pressure.

A further object of the invention is to produce a gasket structure which may be readily substituted for damaged or impaired gaskets of conventional form, into the conventional faucet valve bodies and attached to the conventional handle operated stems, without need of structural change in such valve bodies or stems. Such improved form of gasket element or unit embodies the features of invention which will largely prevent and avoid the objectionable damage incident to erosion and other conditions hereinbefore explained.

The gasket herein disclosed is of form such as to provide two sealing areas, which engage two annular areas of the body of the faucet around the water supply opening. One of these annular areas is in the form of the conventional rib already referred to; and the other annular area comprises a flat surface of the body of the faucet surrounding such rib, and conveniently comprising the floor of an annular recess or depression in the body of the faucet surrounding the water delivery opening. Such floor is at a lower level than the top surface of the rib; and the gasket is provided with a downwardly extending annular flange which is so proportioned as to come into engagement with the floor of the recess simultaneously with engegement of the under surface of the gasket body, with the top annular surface of the rib. Thus, two annular sealing engagements between the gasket and the body of the faucet occur simultaneously as the closing movement approaches finality. The gasket is conveniently formed of rather stiff rubber or rubber-like composition, having some yieldability under compression, but stiff enough to resist improper deformation under the hydrostatic pressures to be expected in conventional household and similar installations, usually not over substantially 100 p.s.i., gage. Due to the slight yieldability of the gasket material, when contact is first established between the upper edge surface of the rib and the under surface of the body of the gasket, and between the floor of the recess and the lower edge surface of the annular flange, a slight further downward forcing of the gasket against such surfaces will result in slight deformation of the gasket body at the annular contacting surfaces, with corresponding production of a double annular seal. At the same time, the annular space between these two seals will trap any slight seepage which may occur between the seal between the rib and the under surface of the body of the gasket, such seepage being retained against final seepage between the seal of the lower edge surface of the flange and the floor of the recess. Since most of the hydrostatic pressure of the supply water has been absorbed by the first mentioned seal, it is evident that only a low hydrostatic pressure will be developed within the annular space between the two seals; thus the sealing force between the flange and the floor of the recess need not be large in order to completely eliminate final leakage past the gasket.

It is evident, however, that some hydrostatic force will be developed within the space between the two seals. Such hydrostatic force will tend to deflect the annular flange of the gasket outwardly. In order to resist such outward deflection of such flange I have provided an annular thin metal ring which is seated between the perimetral surface of the gasket and the lower surface portion of the gasket holder, such ring including a flange which engages the outside cylindrical surface of the gasket, reaching close to but not contacting the floor of the recess into which the annular flange of the gasket seats, when the faucet closing operation has been completed. This ring thus prevents outward radial deflection of the annular flange of the gasket, and ensures even and accurately controlled engagement of the lower edge surface of the gasket's annular flange, with the floor of the recess.

Other objects and uses of the invention will appear from a detailed description of the same, which consists in the features of construction and combinations of parts hereinafter described and claimed.

In the drawing:

FIGURE 1 shows a vertical longitudinal section through a conventional faucet structure, having one of my novel gasket elements, and the reinforcing ring therefor, seated and secured against the lower end of the handle operated sealing holder; the parts being shown in their faucet open position;

FIGURE 2 shows a detailed horizontal section or view looking upward towards the gasket and related elements, being taken on the line 2—2 of FIGURE 1, looking upwardly in the direction of the arrows;

FIGURE 3 shows a detailed horizontal section or view, taken on the line 3—3 of FIGURE 1, looking in the direction of the arrows; being a view looking down towards the upper edge of the annular rib and the encircling annular recess of the body of the faucet;

FIGURE 4 shows a fragmentary view of the companion stationary and movable sealing elements, when separated for the valve open condition;

FIGURE 5 shows another fragmentary view similar to that of FIGURE 4, but with the two elements in faucet closed position;

FIGURES 4 and 5 being on enlarged scale as compared to FIGURES 1, 2 and 3;

FIGURE 6 shows a bottom face view of the thin metal (or other suitable material) tension ring which is set around the gasket during assembly of such gasket to the movable element of the faucet; and FIGURE 7 shows a cross-section taken on the line 7—7 of FIGURE 6, looking in the direction of the arrows;

The gasket and reinforcing ring, and associated parts are shown as applied to a conventional faucet of familiar form, for purposes of convenience, only. Such conventional faucet structue includes the body element 10, having the liquid supply passage 11 extending up to the delivery opening 12; the vertically movable stem 13 whose upper portion is screw-threaded to the neck 14 of the body portion, and includes the projecting portion 15 to which the operation hand-grip 16 is secured. The screw-threaded portion 17 serves to raise or lower the stem for the conventional faucet opening and closing operations, in conventional manner.

Surrounding the upper delivery opening of the supply passage 11 is the upwardly extending rib 18 whose upper surface is substantially flat, but preferably devoid of a sharp outer edge to avoid cutting the bottom surface of the sealing gasket, presently to be described. Such rib is shown in FIGURES 4 and 5 as extending slightly higher than the proximate inside surface of the body portion 10; but such illustration is of an optional embodiment, since the upper surface of the rib may be planar with the inside surface of the portion, or slightly below such inside surface; provided that the proper engagement between the gasket and such top rib surface will occur to enable the desired sealing operation to be produced.

The water delivered from the opening 12 fills the interior of the body portion 10, and is delivered out through the spout 19 in conventional manner.

The lower end of the stem 13 is enlarged as shown at 20 to a size greater than the diameter of the rib 18 beneath such enlarged portion 20. A circular recess 21 is then formed in the bottom face of such enlarged portion, the downwardly extending flange 22 defining such recess 21. The sealing gasket 23 of rubber or rubber-like material, rather stiff but deformable, is of circular form, provided with an encircling shouldered portion 24 about midway of the thickness of such gasket; such shouldered portion defining the reduced diameter upper portion of the gasket. Such reduced diameter portion is received in the recess 21 with a rather snug fit; it being noted that the depth of the recess 21 is substantially the same as the vertical dimension of that portion of the gasket which extends above the shoulder 24. Thus, when the gasket is seated well into the recess of the enlarged portion 20 of the stem 13 the perimetral portion of the gasket is well supported against deformation upwardly when the gasket is forced tightly against the rib 18. This will be again referred to hereinafter.

The gasket is provided with the downwardly extending encircling flange 25 surrounding the upwardly extending recess 26 of the gasket. Such flange is of substantially the same diameter as the perimeter of the enlarged head 20 of the stem 13. The body of the faucet is provided with a floor 27 of circular form, encircling the rib 18; and such floor 27 is at such an elevation that when the stem 13 is lowered by turning, to the position at which the top of the recess 26 of the gasket engages the rib 18, the lower edge surface of the gasket flange 25 comes into sealing contact with such floor 27. Then, by producing a slight further lowering of the stem by further rotation thereof, the top surface of the gasket recess 26 will be firmly pressed against the rib, and at the same time the lower edge surface of the flange 25 will be pressed firmly against the floor 27. Such slight down driving of the stem and gasket after original contact has been established between the top surface of the gasket recess and the rib, and between the lower edge surface of the gasket flange and the floor 27, will produce slight deformations in the top surface of the gasket recess at the area of engagement with the rib, and correspondingly, slight deformations of the lower edge of the gasket flange, as shown in FIGURE 5. Such slight deformations of said parts will ensure certain sealing engagements between the co-operating elements, to thus ensure production of a doubly sealed closed condition of the faucet, since each of the gasket sealing elements (being the annular area of contact of the rib with the top surface of the gasket recess, and the lower edge area of the flange 25 of the gasket) will accommodate itself with any minor irregularities existing in the top surface of the rib, or in the floor 27.

It is now to be noted that the compressing of the gasket flange 25 against the floor 27, will also tend to produce outward deformation of such flange 25 clear up to the location of engagement of the upwardly facing shoulder of the gasket with the downwardly facing shoulder of the enlarged head 20. Such deformation will be aggravated proportionately to the vertical dimension of the gasket flange, and the compressing force produced by the downward forcing of the enlarged head. Such aggravated deformation will be outwardly and will interfere seriously with delivery of a uniformly distributed sealing pressure of the lower edge of the gasket flange, against the floor 27. I have provided means to resist such outward deformation of the rib due to such condition, as follows:

I have provided an encircling ring of tension resisting material, such as a thin ring of steel or of brass, 28, fitted nicely onto the outside cylindrical surface of the gasket flange, as well shown in FIGURES 4 and 5. Such band or ring conveniently comprises a flange of a ring of Z-cross-section, set down around the shouldered surface of the gasket (above the gasket flange 25), with the upper smaller diameter of the Z section between the reduced upper portion of the gasket (of reduced diameter), and the lateral wall of the recess in the bottom face of the enlarged head 20; and with the central portion of the Z in radial engagement with the top surface of the gasket above the flange 25 thereof. Such tension ring may be of thin sheet material, of the thickness order of a few mils. Thus such tension ring, when set onto the perimeter of the gasket, will not prevent setting of the gasket-ring combination into place on the enlarged head 20. It is also noted that the cylindrical flange portion of such tension ring does not interfere with the free up and down movements of the stem and its enlarged head, and the gasket, since the parts, including the stationary body element of the faucet, are properly proportioned to allow descent of the stem, enlarged head, and gasket (including the tension ring) far enough to ensure certain sealing action, without interference between the tension ring and the stationary body element. It is also noted that in the embodiment shown in the figures, the floor 27 comprises a groove floor, the width of the groove being such as to avoid interference between the tension ring and the outer cylindrical surface of the groove.

Conveniently, the gasket and tension ring assembly may be positively retained in place within the recess 21 of the enlarged head 20, by means of a screw 29 as shown in various of the figures.

This application is a continuation-in-part, of my application titled Double Seating Faucet Washer, Serial No. 164,532, filed January 5, 1962 in the United States Patent Office, now abandoned.

I claim:

1. In a faucet, the combination of a hollow body having a supply conduit terminating in a liquid supply port, means to move the stem towards and from the port, a circular rib on the body surrounding the port and extending towards the stem and providing an annular sealing edge surface lying in a plane normal to the direction of movement of the stem, an enlarged head on the end of the stem, said head having a diameter greater than that of the rib and being provided with a perimetral flange extending towards the rib and providing a flange edge surface lying in a plane normal to the direction of movement of the stem and defining a circular recess in the enlarged head of diameter greater than the diameter of the rib, the body having an annular surface surrounding the rib and lying in a plane parallel to the plane of the edge surface of the rib and below said rib edge surface, together with a gasket of slightly yieldable material and including a body portion of diameter substantially equal to that of the perimetral flange of the enlarged head, and having a central thickness portion of diameter and thickness to seal snugly into the circular recess of the enlarged head, the perimetral portion of said gasket being provided with an annular surface facing the edge of the perimetral flange of the enlarged head substantially at the plane of said surface; said gasket also including a circular surface facing the rib of the body and lying in a plane normal to the direction of stem movement and constituting a primary gasket sealing surface, together with a circular flange on the gasket of diameter greater than that of the body rib and of dimension in the direction of stem movement, equal to the height of the rib measured between the plane of the edge surface of the rib and the plane of the annular surface of the body surrounding the rib; together with a circular tension band surrounding the gasket flange surface between the perimetral flange of the enlarged head and a circular line around the gasket flange above the plane of the edge surface of the gasket flange, said tension band retaining the gasket flange against outward spread over the flange area enclosed by said tension band; said tension band comprising the larger diameter flange of a circular reinforcing element of Z-cross-section, the smaller diameter flange of said reinforcing element being located between the concave surface of the perimetral flange of the enlarged head, and the gasket portion which is located in the circular recess of such enlarged head; and the central portion of said reinforcing element being located between the flange edge surface of the enlarged head, and the annular surface of the gasket which faces said edge of the perimetral flange of the enlarged head.

2. A faucet as defined in claim 1, wherein said reinforcing element comprises sheet metal of a thickness of the order of a few mils.

References Cited in the file of this patent

UNITED STATES PATENTS

| | | |
|---|---|---|
| 2,489,623 | Delany | Nov. 29, 1949 |

FOREIGN PATENTS

| | | |
|---|---|---|
| 390,695 | Great Britain | Apr. 13, 1933 |
| 40,539 | France | Apr. 19, 1932 |
| | (1st Add. of 716,111) | |